United States Patent [19]
Lee

[11] Patent Number: 5,854,524
[45] Date of Patent: Dec. 29, 1998

[54] MOTOR WITH SEMI-SPHERICAL BEARING

[75] Inventor: Chang-Woo Lee, Suwon, Rep. of Korea

[73] Assignee: Samsung Electronics Co., Ltd., Suwon, Rep. of Korea

[21] Appl. No.: 934,395

[22] Filed: Sep. 19, 1997

[30] Foreign Application Priority Data

Nov. 13, 1996 [KR] Rep. of Korea ......................... 9639852

[51] Int. Cl.⁶ .............................. F16C 17/10; H02K 7/08
[52] U.S. Cl. .............................. 310/90; 310/90; 384/123; 384/108; 384/112
[58] Field of Search .............................. 310/90; 384/112, 384/108, 110, 123

[56] References Cited

U.S. PATENT DOCUMENTS

| | | | |
|---|---|---|---|
| 2,695,198 | 11/1954 | Brugger | 384/108 |
| 3,265,452 | 8/1966 | Pan et al. | 384/112 |
| 3,466,103 | 9/1969 | Davies et al. | 384/112 |
| 3,467,449 | 9/1969 | Muijderman | 384/112 |
| 3,575,476 | 4/1971 | Ortman | 384/112 |
| 3,764,186 | 10/1973 | Laing et al. | 384/112 |
| 3,950,039 | 4/1976 | Huber et al. | 384/112 |
| 4,043,612 | 8/1977 | Orcutt | 384/108 |
| 5,173,797 | 12/1992 | Zedekar et al. | 310/90 |
| 5,193,084 | 3/1993 | Christiaens | 384/112 |
| 5,277,499 | 1/1994 | Kameyama | 384/123 |
| 5,328,272 | 7/1994 | Ainsle et al. | 384/112 |
| 5,357,163 | 10/1994 | Minakuchi et al. | 310/90 |

FOREIGN PATENT DOCUMENTS

| | | | |
|---|---|---|---|
| 5-87126 | 4/1993 | Japan | 310/90 |
| 9-303381 | 11/1997 | Japan | 184/112 |

*Primary Examiner*—Clayton E. LaBalle
*Assistant Examiner*—Karl Tamai
*Attorney, Agent, or Firm*—Burns, Doane, Swecker & Mathis, L.L.P.

[57] ABSTRACT

Disclosed is a motor including a stator, a rotor cooperating with the stator, a rotating shaft rotating with the rotor, the rotating shaft being provided in its bottom with a receiving space, and a semi-spherical bearing disposed in the receiving space of the rotating shaft. The semi-spherical bearing is truncated to define a planar portion and part of the receiving space is defined by a surface corresponding to the planar portion. The planar portion is provided with a plurality of grooves formed in a spiral-shape to allow for suction of air for smooth rotation.

2 Claims, 4 Drawing Sheets

MOTOR WITH SEMI-SPHERICAL BEARING

BACKGROUND OF THE INVENTION

1. Field of the Invention

The present invention relates to a motor, and more particularly, to a motor with a semi-spherical bearing which is structured to increase supporting force against load in an axial direction.

2. Description of Related Art

Among the different bearings that support shafts which undergo rotative or rectilinear movement and make such movement smooth, the semi-spherical bearing is advantageous in that it is able to simultaneously support load in both the radial and axial directions. Accordingly, it is unnecessary to use separate bearings for each of the directions such that weight can be reduced, allowing application to internal motors in electronic goods such as computer hard drives, laser beam scanners, laser beam printers, etc.

Especially, with regard to the laser beam printer, laser beams are used to perform the printing operation. That is, a scanned image is formed on a photosensitive drum, which is responsive to light, by radiating the laser beams thereon. A rotating multi-faceted mirror system is provided to move the beams at a uniform velocity such that the beams are aligned on the photosensitive drum in an axial direction thereon.

Referring to FIG. 1, there is shown a sectional view illustrating a rotating multi-faceted mirror system in which a conventional motor is mounted. As shown in the drawing, the rotating multi-faceted mirror system 10 comprises a housing 11 and a multi-faceted mirror 12 disposed within the housing 11 and exposed through a hole 11a formed on the housing 11. Disposed on a lower side of the multi-faceted mirror 12 is a motor 20. The motor 20 comprises a stator 21 fixed on an inner circumference of the housing and a rotor 22 disposed opposing an upper side of the stator 21 so that it electromagnetically cooperates therewith. The multi-faceted mirror 12 is disposed above the rotor 22 so that it can rotate by the cooperation of the stator 21 and the rotor 22. The rotor 22 is disposed around a rotating shaft 23, on a bottom of which a receiving space 23a for receiving a semi-spherical bearing 24 is received. That is, the semi-spherical bearing 24 rotatably supports the rotating shaft 23. Formed on the semi-spherical bearing 24 is a plurality of spiral-shaped grooves 24a which induce air between the rotating shaft 23 and the semi-spherical bearing 24 to improve the smooth rotation of the bearing 24. The grooves 24a make it easy to generate dynamic pressure on the bearing 24.

However, in the above described conventional motor, as most of the load is exerted in an axial direction of the semi-spherical bearing, although load in the axial direction of the rotating shaft or the multi-faceted mirror can be partially supported by dynamic pressure which is generated at a normal position, an insufficient amount of this dynamic pressure is generated in the axial direction for full support because of the shape of the bearing.

Particularly, since air is induced into the receiving space via the grooves, an insufficient amount of dynamic pressure is generated around the upper side of the semi-spherical bearing.

If the load in the axial direction cannot be sufficiently supported by the semi-spherical bearing, the multi-faceted mirror does not smoothly rotate. This is problematic in that the multi-faceted mirror system requires accurate rotation to operate properly.

SUMMARY OF THE INVENTION

The present invention is made in an effort to solve the above described prior art problems. It is an object of the present invention to provide a motor comprising a stator, a rotor cooperating with the stator, a rotating shaft rotating with the rotor, the rotating shaft being provided in its bottom a receiving space, and a semi-spherical bearing disposed in the receiving space of the rotating shaft, wherein the semi-spherical bearing is truncated to define a planar portion and part of the receiving space is defined by a surface corresponding to the planar portion.

The planar portion is provided with a plurality of grooves formed in a spiral-shape to allow for suction of air for smooth rotation.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

A preferred embodiment of the present invention will now be described in detail with reference to the accompanying drawings.

Figure 1:
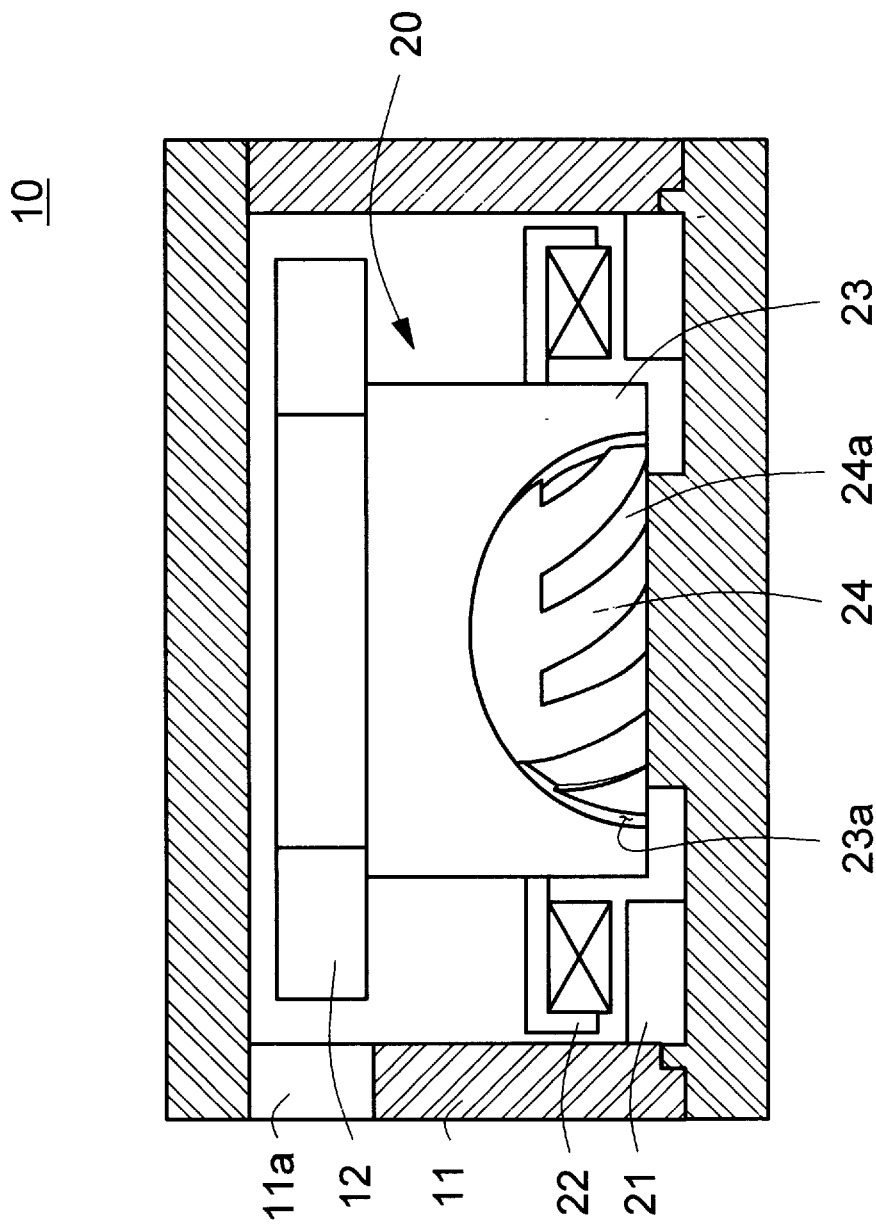
FIG. 1 is a sectional view of a rotating multi-faceted mirror system where a conventional motor is mounted.
Figure 2:
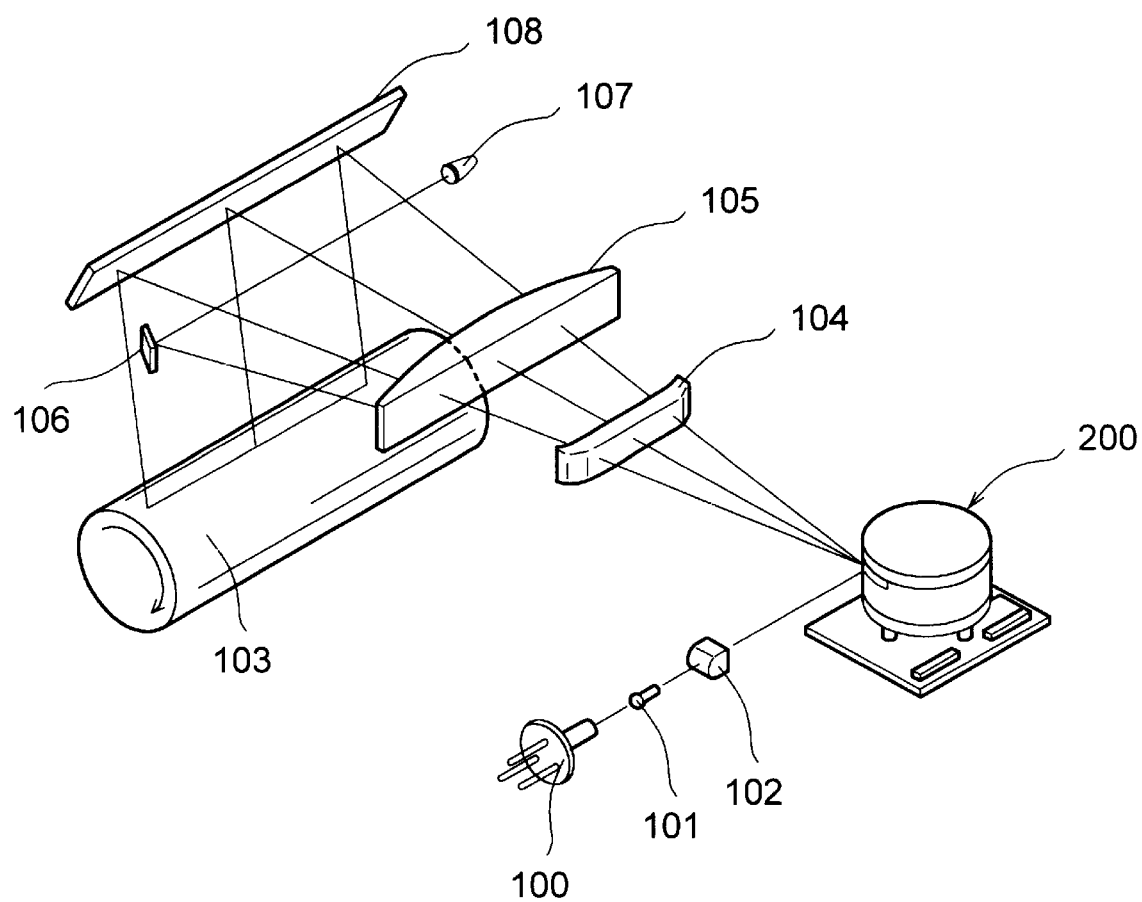
FIG. 2 is an exploded perspective view illustrating an exampled laser beam printer where a motor according to a preferred embodiment of the present invention is applied.

Referring first to FIG. 2, there is shown a schematic exploded perspective view illustrating an exampled laser beam printer using a rotating multi-faceted mirror system in which the inventive motor is applied.

As shown in the drawing, the laser beam printer comprises a semiconductor laser 100 and a collimate lens 101 for converting light from the semiconductor laser 100 into laser beams. The laser beam printer further comprises a rotating multi-faceted mirror system 200 for converting the laser beams into a fan beam, and a cylindrical lens 102 disposed between the multi-faceted mirror system 200 and the collimate lens 101.

There is provided a photosensitive drum 103 for recording a print information pattern via the multi-faceted mirror system 200. Disposed between the multi-faceted lens system 200 and the photosensitive drum 103, in order, are a spherical lens 104, a toric lens 105, a horizontal synchronizing lens 106, a detecting sensor 107, and a reflector 108.

Beams are radiated toward the photosensitive drum 103 at a uniform velocity by the multi-faceted lens system 200, pass through the spherical lens 104 to be focused on the photosensitive drum 103, and are reflected onto desired positions on the photosensitive drum 103 by the reflector 108. Further, the horizontal synchronizing lens 106 and the detecting sensor 107 are used to ensure that the beams are radiated at equal horizontal positions on the photosensitive drum 103.

Figure 3:
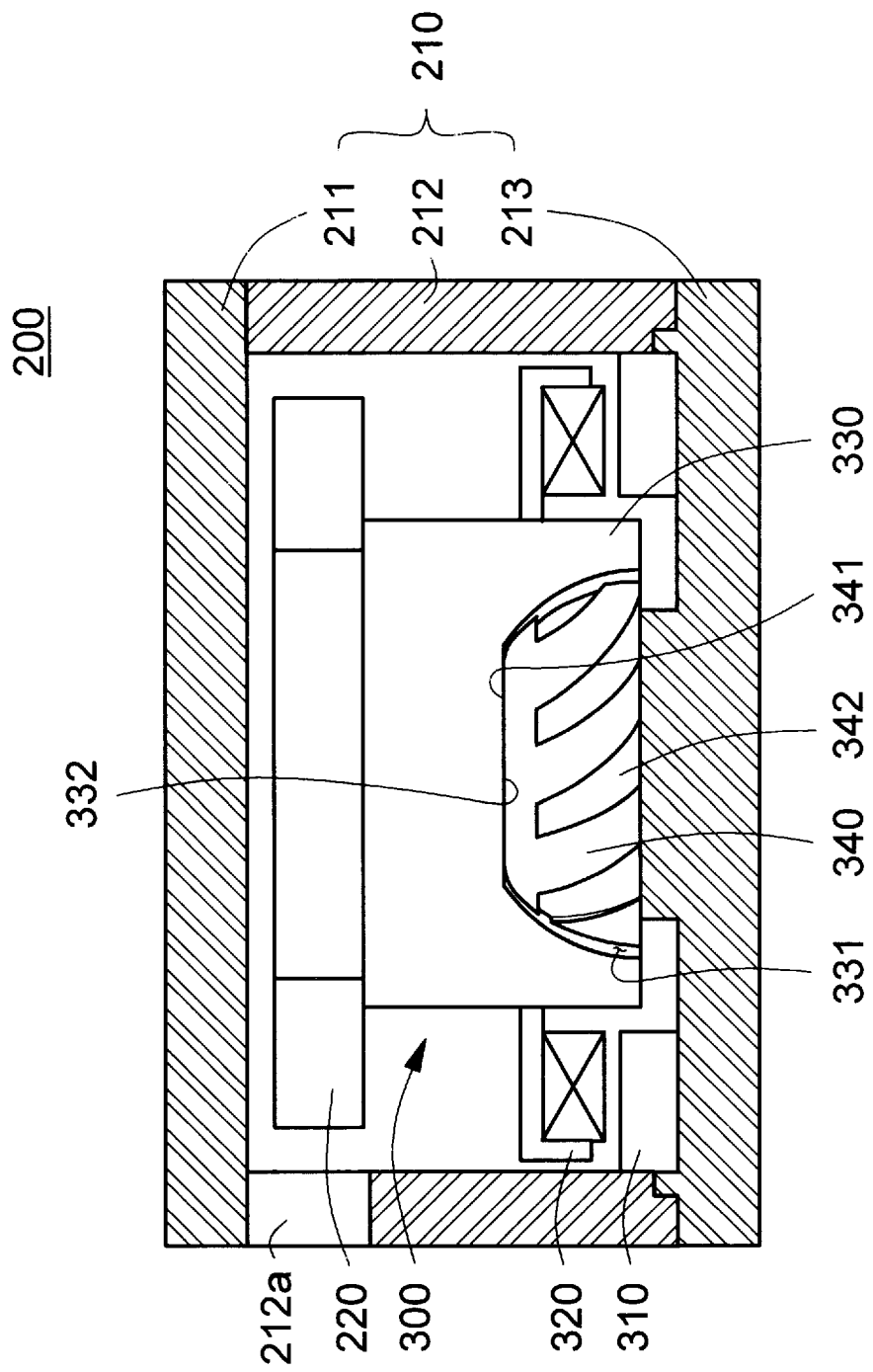
FIG. 3 is a sectional view illustrating a multi-faceted mirror system where a motor according to a preferred embodiment of the present invention is mounted.

Referring to FIG. 3, there is shown a sectional view illustrating the multi-faceted mirror system 200 where a motor according to preferred embodiment of the present invention is mounted.

The rotating multi-faceted mirror system 200 comprises a housing 210 having a cylindrical member 212, upper and lower ends of which are opened, and upper and lower members 211 and 213 for closing the upper and lower open ends of the cylindrical member 212.

The rotating multi-faceted mirror system 200 further comprises a multi-faceted mirror 220 disposed within the housing 210. The multi-faceted mirror 220 moves the laser beams to the axial direction of the photosensitive drum 103 at a uniform velocity and advances the laser beams whenever the facet of the mirror 220 is changed so as to form a scanned image onto the photosensitive drum 210. In addition, part of the multi-faceted mirror 220 is exposed through a hole 212a formed on an upper side of the cylindrical member 212. Disposed on a lower side of the multi-faceted mirror 220 is a motor 300.

The motor 300 comprises a stator 310 fixed on an inner circumference of the housing and a rotor 320 disposed opposing an upper side of the stator 310 so that it electromagnetically cooperates therewith. The multi-faceted mirror 220 is disposed above the rotor 320 so that it can rotate by the cooperation of the stator 310 and the rotor 320. The rotor 320 is disposed around a rotating shaft 330, on a bottom of which a receiving space 331 for receiving a semi-spherical bearing 340 is received. That is, the semi-spherical bearing 340 rotatably supports the rotating shaft 330.

The upper portion of the semi-spherical bearing 340 is truncated to define a planar portion 341 so that dynamic pressure acting in the axial direction for supporting load applied in the axial direction can be increased. The receiving space 331 is complimentarily contoured to the shape of the truncated semi-spherical bearing 340. That is, the top surface 332 of the receiving space 331 is shaped to correspond to that of the planar portion 341 of the bearing 340. This ensures that the planar portion 341 of the semi-spherical bearing 340 surface-contacts the top surface 332 of the receiving space 331, thereby increasing dynamic pressure acting in the axial direction of the rotating shaft to support loads generated by the multi-faceted mirror 220 and the rotor 320.

Formed on an outer circumference i.e., a segment of the spherical side surface, of the semi-spherical bearing 24 are a plurality of first grooves 342 to allow for smooth rotation with the rotating shaft 330. The first grooves 342 are spiral-shaped to induce air into a gap between the rotating shaft 330 and the semi-spherical bearing 340 when the rotating shaft 330 rotates, the air functioning as lubricant.

Figure 4:
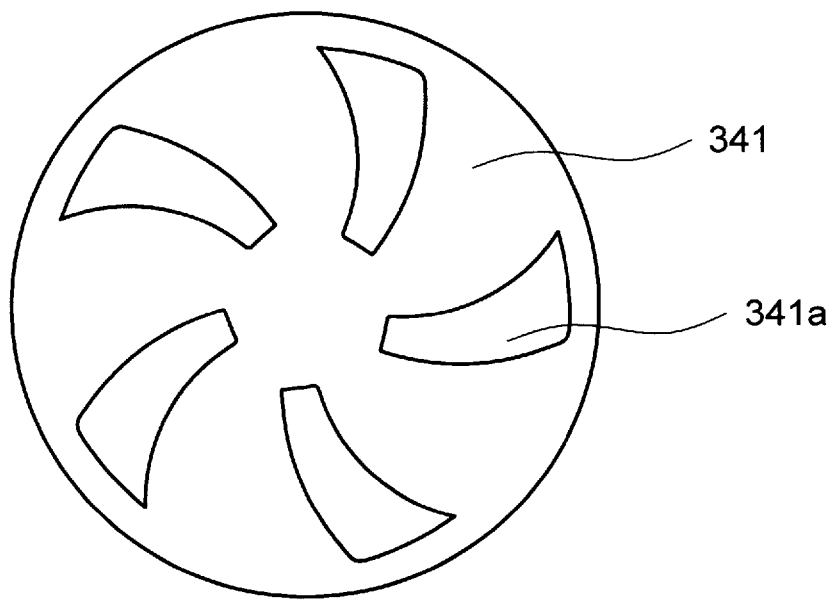
FIG. 4 is a schematic plane view illustrating a planar portion of a semi-spherical bearing of a motor according to a preferred embodiment of the present invention.

As shown in FIG. 4, formed on the planar portion 341 of the semi-spherical bearing are a plurality of second grooves 341a spiral-shaped in a radial direction. The second grooves 341a ensure that air is induced between the planar portion 341 and the top surface 332 of the receiving space 331 when the rotating shaft 330 rotates, thereby making it easy to generate dynamic pressure.

In the above described multi-faceted mirror 220, when electric power is applied to the motor 300, the rotating shaft 330 rotates. At this point, dynamic pressure is generated by air induced through the first and second grooves 342 and 341a between the semi-spherical bearing 340 and the receiving space 331, thereby rising the rotating shaft 330 and smoothly rotating the multi-faceted mirror 220. Therefore, since the load of the respective rotating shaft and multi-faceted mirror 330 and 220 are dispersed on a dynamic pressure generating area formed on the planar portion 341 of the semi-spherical bearing 340, the semi-spherical bearing 340 does not receive an unequal exertion of a load. Particularly, the load of the semi-spherical bearing in the axial direction larger than that in the radial direction is also dispersed by the planar portion 341.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A motor comprising:

a stator;

a rotor cooperating with the stator;

a rotating shaft rotating with the rotor, the rotating shaft including a downwardly facing bottom surface in which is formed a receiving space having a downwardly facing first planar surface; and a semi-spherical bearing disposed in the receiving space of the rotating shaft, wherein the semi-spherical bearing includes a side surface forming a segment of a spherical surface, and a second planar surface intersecting the spherical surface segment to define a truncation of that spherical surface segment, the second planar surface opposing the first planar surface and including a plurality of grooves, each arranged in a spiral shape.

2. The motor according to claim 1 wherein the spherical surface segment includes grooves each arranged in a spiral shape.

* * * * *